United States Patent
Chen et al.

(10) Patent No.: US 7,426,246 B2
(45) Date of Patent: *Sep. 16, 2008

(54) DUAL LAYER SIGNAL PROCESSING IN A LAYERED MODULATION DIGITAL SIGNAL SYSTEM

(75) Inventors: Ernest C. Chen, San Pedro, CA (US); Tiffany S. Furuya, Los Angeles, CA (US); Philip R. Hilmes, Santa Monica, CA (US); Joseph Santoru, Agoura Hills, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/603,776

(22) Filed: Nov. 22, 2006

(65) Prior Publication Data

US 2007/0071134 A1    Mar. 29, 2007

Related U.S. Application Data

(63) Continuation of application No. 10/068,047, filed on Feb. 5, 2002, now Pat. No. 7,173,981, which is a continuation-in-part of application No. 09/844,401, filed on Apr. 27, 2001, now Pat. No. 7,209,524.

(51) Int. Cl.
*H03D 3/00* (2006.01)

(52) U.S. Cl. .................. 375/322; 375/261; 375/279; 375/281; 375/298; 375/308; 329/304; 332/103; 370/206

(58) Field of Classification Search ............. 375/261, 375/279, 298, 322; 370/206; 329/304
See application file for complete search history.

(56) References Cited

U.S. PATENT DOCUMENTS

| | | | |
|---|---|---|---|
| 3,076,180 | A | 1/1963 | Havens et al. |
| 3,383,598 | A | 5/1968 | Sanders |
| 3,878,468 | A | 4/1975 | Falconer et al. |
| 3,879,664 | A | 4/1975 | Monsen |
| 3,974,449 | A | 8/1976 | Falconer |
| 4,039,961 | A | 8/1977 | Ishio et al. |

(Continued)

FOREIGN PATENT DOCUMENTS

DE    3642213    12/1986

(Continued)

OTHER PUBLICATIONS

Palicot, "Possible coding and modulation approaches to improve service availability for digital HDTV satellite broadcasting at 22 GHz", IEEE Transactions on Consumer Electronics, vol. 39, Issue 3, Aug. 1993 pp. 660-667.*

(Continued)

*Primary Examiner*—Mohammed Ghayour
*Assistant Examiner*—Juan Alberto Torres

(57) ABSTRACT

Systems and methods for receiving layered modulation for digital signals are presented. An exemplary apparatus comprises a tuner for receiving a layered signal and producing a layered in-phase signal and a layered quadrature signal therefrom, an analog-to-digital converter for digitizing the layered in-phase signal and the layered quadrature signal and a processor for decoding the layered in-phase signal and the layered quadrature signal to produce one or more discrete layer signals.

52 Claims, 8 Drawing Sheets

U.S. PATENT DOCUMENTS

| | | |
|---|---|---|
| 4,068,186 A | 1/1978 | Sato et al. |
| 4,213,095 A | 7/1980 | Falconer |
| 4,253,184 A | 2/1981 | Gitlin et al. |
| 4,283,684 A | 8/1981 | Satoh |
| 4,384,355 A | 5/1983 | Werner |
| RE31,351 E | 8/1983 | Falconer |
| 4,416,015 A | 11/1983 | Gitlin |
| 4,422,175 A | 12/1983 | Bingham et al. |
| 4,484,337 A | 11/1984 | Leclert et al. |
| 4,500,984 A | 2/1985 | Shimbo et al. |
| 4,519,084 A | 5/1985 | Langseth |
| 4,594,725 A | 6/1986 | Desperben et al. |
| 4,628,507 A | 12/1986 | Otani |
| 4,637,017 A | 1/1987 | Assal et al. |
| 4,647,873 A | 3/1987 | Beckner et al. |
| 4,654,863 A | 3/1987 | Belfield et al. |
| 4,670,789 A | 6/1987 | Plume |
| 4,709,374 A | 11/1987 | Farrow |
| 4,800,573 A | 1/1989 | Cupo |
| 4,829,543 A | 5/1989 | Borth et al. |
| 4,835,790 A | 5/1989 | Yoshida et al. |
| 4,847,864 A | 7/1989 | Cupo |
| 4,860,315 A | 8/1989 | Hosoda et al. |
| 4,878,030 A | 10/1989 | Vincze |
| 4,896,369 A | 1/1990 | Adams et al. |
| 4,918,708 A | 4/1990 | Pottinger et al. |
| 4,993,047 A | 2/1991 | Moffat et al. |
| 5,043,734 A | 8/1991 | Niho |
| 5,088,110 A | 2/1992 | Bonnerot et al. |
| 5,111,155 A | 5/1992 | Keate et al. |
| 5,121,414 A | 6/1992 | Levine et al. |
| 5,199,047 A | 3/1993 | Koch |
| 5,206,889 A | 4/1993 | Unkrich |
| 5,221,908 A | 6/1993 | Katz et al. |
| 5,229,765 A | 7/1993 | Gardner |
| 5,233,632 A | 8/1993 | Baum et al. |
| 5,237,292 A | 8/1993 | Chethik |
| 5,285,474 A | 2/1994 | Chow et al. |
| 5,285,480 A | 2/1994 | Chennakeshu et al. |
| 5,317,599 A | 5/1994 | Obata |
| 5,329,311 A | 7/1994 | Ward et al. |
| 5,337,014 A | 8/1994 | Najle et al. |
| 5,353,307 A | 10/1994 | Lester et al. |
| 5,412,325 A | 5/1995 | Meyers |
| 5,430,770 A | 7/1995 | Abbey |
| 5,450,623 A | 9/1995 | Yokoyama et al. |
| 5,467,197 A | 11/1995 | Hoff |
| 5,471,508 A | 11/1995 | Koslov |
| 5,493,307 A | 2/1996 | Tsujimoto |
| 5,513,215 A | 4/1996 | Marchetto et al. |
| 5,555,257 A | 9/1996 | Dent |
| 5,577,067 A | 11/1996 | Zimmerman |
| 5,577,087 A | 11/1996 | Furuya |
| 5,579,344 A | 11/1996 | Namekata |
| 5,581,229 A | 12/1996 | Hunt |
| 5,602,868 A | 2/1997 | Wilson |
| 5,603,084 A | 2/1997 | Henry et al. |
| 5,606,286 A | 2/1997 | Bains |
| 5,608,331 A | 3/1997 | Newberg et al. |
| 5,625,640 A | 4/1997 | Palmer et al. |
| 5,642,358 A | 6/1997 | Dent |
| 5,648,955 A | 7/1997 | Jensen et al. |
| 5,732,113 A | 3/1998 | Schmidl et al. |
| 5,793,818 A | 8/1998 | Claydon et al. |
| 5,815,531 A | 9/1998 | Dent |
| 5,819,157 A | 10/1998 | Ben-Efraim et al. |
| 5,828,710 A | 10/1998 | Beale |
| 5,848,060 A | 12/1998 | Dent |
| 5,870,439 A | 2/1999 | Ben-Efraim et al. |
| 5,870,443 A | 2/1999 | Rahnema |
| 5,937,004 A | 8/1999 | Fasulo, II et al. |
| 5,940,025 A | 8/1999 | Koehnke et al. |
| 5,940,750 A | 8/1999 | Wang |
| 5,952,834 A | 9/1999 | Buckley |
| 5,956,373 A | 9/1999 | Goldston et al. |
| 5,960,040 A | 9/1999 | Cai et al. |
| 5,963,845 A | 10/1999 | Floury et al. |
| 5,966,048 A | 10/1999 | Thompson |
| 5,966,186 A | 10/1999 | Shigihara et al. |
| 5,966,412 A | 10/1999 | Ramaswamy |
| 5,970,098 A | 10/1999 | Herzberg |
| 5,970,156 A | 10/1999 | Hummelgaard et al. |
| 5,970,429 A | 10/1999 | Martin |
| 5,978,652 A | 11/1999 | Burr et al. |
| 5,987,068 A | 11/1999 | Cassia et al. |
| 5,995,832 A | 11/1999 | Mallinckrodt |
| 5,999,793 A | 12/1999 | Ben-Efraim et al. |
| 6,002,713 A | 12/1999 | Goldstein et al. |
| 6,008,692 A | 12/1999 | Escartin |
| 6,018,556 A | 1/2000 | Janesch et al. |
| 6,021,159 A | 2/2000 | Nakagawa |
| 6,028,894 A | 2/2000 | Oishi et al. |
| 6,032,026 A | 2/2000 | Seki et al. |
| 6,034,952 A | 3/2000 | Dohi et al. |
| 6,049,566 A | 4/2000 | Saunders et al. |
| 6,052,586 A | 4/2000 | Karabinis |
| 6,055,278 A | 4/2000 | Ho et al. |
| 6,061,393 A | 5/2000 | Tsui et al. |
| 6,072,841 A | 6/2000 | Rahnema |
| 6,078,645 A | 6/2000 | Cai et al. |
| 6,084,919 A | 7/2000 | Kleider et al. |
| 6,104,747 A | 8/2000 | Jalloul et al. |
| 6,108,374 A | 8/2000 | Balachandran et al. |
| 6,125,148 A | 9/2000 | Frodigh et al. |
| 6,125,260 A | 9/2000 | Wiedeman et al. |
| 6,128,357 A | 10/2000 | Lu et al. |
| 6,131,013 A | 10/2000 | Bergstrom et al. |
| 6,134,282 A | 10/2000 | Ben-Efraim et al. |
| 6,140,809 A | 10/2000 | Doi |
| 6,141,534 A | 10/2000 | Snell et al. |
| 6,144,708 A | 11/2000 | Maruyama |
| 6,166,601 A | 12/2000 | Shalom et al. |
| 6,177,836 B1 | 1/2001 | Young et al. |
| 6,178,158 B1 | 1/2001 | Suzuki et al. |
| 6,188,717 B1 | 2/2001 | Kaiser et al. |
| 6,192,088 B1 | 2/2001 | Aman et al. |
| 6,212,360 B1 | 4/2001 | Fleming et al. |
| 6,219,095 B1 | 4/2001 | Zhang et al. |
| 6,246,717 B1 | 6/2001 | Chen et al. |
| 6,249,180 B1 | 6/2001 | Maalej et al. |
| 6,266,534 B1 | 7/2001 | Raith et al. |
| 6,272,679 B1 | 8/2001 | Norin |
| 6,275,678 B1 | 8/2001 | Bethscheider et al. |
| 6,297,691 B1 | 10/2001 | Anderson et al. |
| 6,304,594 B1 | 10/2001 | Salinger |
| 6,307,435 B1 | 10/2001 | Nguyen et al. |
| 6,313,885 B1 | 11/2001 | Patel et al. |
| 6,314,441 B1 | 11/2001 | Raghunath |
| 6,320,464 B1 | 11/2001 | Suzuki et al. |
| 6,320,919 B1 | 11/2001 | Khayrallah et al. |
| 6,325,332 B1 | 12/2001 | Cellier et al. |
| 6,330,336 B1 | 12/2001 | Kasama |
| 6,333,924 B1 | 12/2001 | Porcelli et al. |
| 6,335,951 B1 | 1/2002 | Cangiani et al. |
| 6,366,309 B1 | 4/2002 | Siegle |
| 6,369,648 B1 | 4/2002 | Kirkman |
| 6,377,116 B1 | 4/2002 | Mattsson et al. |
| 6,389,002 B1 | 5/2002 | Schilling |
| 6,411,659 B1 | 6/2002 | Liu et al. |
| 6,411,797 B1 | 6/2002 | Estinto |
| 6,426,740 B1 | 7/2002 | Goto et al. |
| 6,426,822 B1 | 7/2002 | Winter et al. |
| 6,433,835 B1 | 8/2002 | Hartson et al. |
| 6,452,977 B1 | 9/2002 | Goldston et al. |

| | | |
|---|---|---|
| 6,477,398 B1 | 11/2002 | Mills |
| 6,501,804 B1 | 12/2002 | Rudolph et al. |
| 6,515,713 B1 | 2/2003 | Nam |
| 6,522,683 B1 | 2/2003 | Smee et al. |
| 6,529,715 B1 | 3/2003 | Kitko et al. |
| 6,535,497 B1 | 3/2003 | Raith |
| 6,535,801 B1 | 3/2003 | Geier et al. |
| 6,574,235 B1 | 6/2003 | Arslan et al. |
| 6,597,750 B1 | 7/2003 | Knutson et al. |
| 6,657,978 B1 | 12/2003 | Millman |
| 6,661,761 B2 | 12/2003 | Hayami et al. |
| 6,678,336 B1 | 1/2004 | Katoh et al. |
| 6,700,442 B2 | 3/2004 | Ha |
| 6,718,184 B1 | 4/2004 | Aiken et al. |
| 6,731,622 B1 | 5/2004 | Frank et al. |
| 6,731,700 B1 | 5/2004 | Yakhnich et al. |
| 6,745,050 B1 | 6/2004 | Forsythe et al. |
| 6,754,872 B2 | 6/2004 | Zhang et al. |
| 6,772,182 B1 | 8/2004 | McDonald et al. |
| 6,775,521 B1 | 8/2004 | Chen |
| 6,795,496 B1 | 9/2004 | Soma et al. |
| 6,809,587 B2 | 10/2004 | Ghannouchi et al. |
| 6,892,068 B2 | 5/2005 | Karabinis et al. |
| 6,922,436 B1 | 7/2005 | Porat et al. |
| 6,922,439 B2 | 7/2005 | Yamaguchi et al. |
| 6,934,314 B2 | 8/2005 | Harles et al. |
| 6,947,741 B2 | 9/2005 | Beech et al. |
| 6,956,841 B1 | 10/2005 | Stahle et al. |
| 6,956,924 B2 | 10/2005 | Linsky et al. |
| 6,970,496 B1 | 11/2005 | Ben-Bassat et al. |
| 6,980,609 B1 | 12/2005 | Ahn |
| 6,990,627 B2 | 1/2006 | Uesugi et al. |
| 6,999,510 B2 | 2/2006 | Batruni |
| 7,041,406 B2 | 5/2006 | Schuler et al. |
| 7,073,116 B1 * | 7/2006 | Settle et al. ............... 714/786 |
| 7,079,585 B1 * | 7/2006 | Settle et al. ............... 375/261 |
| 7,154,958 B2 | 12/2006 | Dabak et al. |
| 7,161,931 B1 | 1/2007 | Li et al. |
| 7,173,981 B1 | 2/2007 | Chen et al. |
| 7,230,992 B2 | 6/2007 | Walker et al. |
| 7,239,876 B2 | 7/2007 | Johnson et al. |
| 7,251,291 B1 | 7/2007 | Dubuc et al. |
| 7,263,119 B1 | 8/2007 | Hsu et al. |
| 2001/0012322 A1 | 8/2001 | Nagaoka et al. |
| 2001/0024479 A1 | 9/2001 | Samarasooriya |
| 2001/0055295 A1 | 12/2001 | Akiyama et al. |
| 2002/0006795 A1 | 1/2002 | Norin et al. |
| 2002/0009141 A1 | 1/2002 | Yamaguchi et al. |
| 2002/0051435 A1 | 5/2002 | Giallorenzi et al. |
| 2002/0071506 A1 | 6/2002 | Lindquist et al. |
| 2002/0082792 A1 | 6/2002 | Bourde et al. |
| 2002/0136327 A1 | 9/2002 | El-Gamal et al. |
| 2002/0158619 A1 | 10/2002 | Chen |
| 2002/0172296 A1 | 11/2002 | Pilcher |
| 2002/0176516 A1 | 11/2002 | Jeske et al. |
| 2002/0186761 A1 | 12/2002 | Corbaton et al. |
| 2003/0002471 A1 | 1/2003 | Crawford et al. |
| 2003/0043941 A1 | 3/2003 | Johnson et al. |
| 2003/0072385 A1 | 4/2003 | Dragonetti |
| 2003/0138037 A1 | 7/2003 | Kaku et al. |
| 2003/0147472 A1 | 8/2003 | Bach et al. |
| 2003/0171102 A1 | 9/2003 | Yang |
| 2003/0185310 A1 | 10/2003 | Ketchum et al. |
| 2003/0194022 A1 | 10/2003 | Hammons et al. |
| 2004/0013084 A1 | 1/2004 | Thomas et al. |
| 2004/0091059 A1 | 5/2004 | Chen |
| 2004/0110467 A1 | 6/2004 | Wang |
| 2004/0137863 A1 | 7/2004 | Walton et al. |
| 2004/0146014 A1 | 7/2004 | Hammons et al. |
| 2004/0146296 A1 | 7/2004 | Gerszberg et al. |
| 2004/0196935 A1 | 10/2004 | Nieto |
| 2005/0008100 A1 | 1/2005 | Chen |
| 2005/0037724 A1 | 2/2005 | Walley et al. |
| 2006/0013333 A1 | 1/2006 | Chen |
| 2006/0022747 A1 * | 2/2006 | Chen et al. ............... 330/42 |
| 2006/0045191 A1 | 3/2006 | Vasanth et al. |
| 2006/0056541 A1 | 3/2006 | Chen et al. |
| 2007/0011716 A1 | 1/2007 | Koslov et al. |
| 2007/0121718 A1 | 5/2007 | Wang et al. |

FOREIGN PATENT DOCUMENTS

| | | |
|---|---|---|
| EP | 0115218 | 8/1984 |
| EP | 0222076 | 8/1986 |
| EP | 0238822 | 9/1987 |
| EP | 0356096 | 2/1990 |
| EP | 0929164 | 7/1999 |
| EP | 1011245 | 6/2000 |
| EP | 1065854 | 1/2001 |
| EP | 1335512 | 8/2003 |
| FR | 2696295 | 4/1994 |
| FR | 2724522 | 3/1996 |
| JP | 2-005631 | 1/1990 |
| JP | 2-095033 | 4/1990 |
| JP | 03139027 | 6/1991 |
| JP | 5-041683 | 2/1993 |
| JP | 5-114878 | 5/1993 |
| JP | 5-252084 | 9/1993 |
| JP | 07-038615 | 2/1995 |
| JP | 2002118611 | 4/2002 |
| KR | 2001 0019997 | 3/2001 |
| WO | WO 99/00957 | 1/1999 |
| WO | WO 99/20001 | 4/1999 |
| WO | WO 99/23718 | 5/1999 |
| WO | 0079753 A1 | 12/2000 |
| WO | 0113532 A1 | 2/2001 |
| WO | WO 01/19013 | 3/2001 |
| WO | WO 01/39455 | 5/2001 |
| WO | WO 01/39456 | 5/2001 |
| WO | WO 01/80471 | 10/2001 |
| WO | WO 02/073817 | 9/2002 |
| WO | WO 03/105375 | 12/2003 |
| WO | WO/2003/105375 * | 12/2003 |
| WO | WO 2005/074171 | 8/2005 |
| WO | WO 2005/086444 | 9/2005 |

OTHER PUBLICATIONS

Combarel, "HD-SAT modems for the satellite broadcasting in the 20 GHz frequency band", IEEE Transactions on Consumer Electronics, vol. 41, Issue 4, Nov. 1995 pp. 991-999.*

The Authoritive Dictionary of IEEE Standards Terms; Seventh Edition, pp. 1047—definition of "signal", 2000.

Fang, T. et al.; "Fourth-Power Law Clock Recovery with Prefiltering", Proceedings of the International Conference on Communications (ICC), Geneva, May 23-26, 1993, New York, IEEE, US, vol. 3, May 23, 1993, pp. 811-815, XP010137089, ISBN:0-7803-0950-2, Section I, Introduction.

Janssen, G.J.M; Slimane, S.B.: "Performance of a Multiuser Detector for M-PSK Signals Based on Successive Cancellation", ICC 2001, 2001 IEEE International Conference on Communications, Conference Record, Helsinky, Finland, Jun. 11-14, 2001, XP010552960.

Slimane, S.B.; Janssen, G.J.M: "Power Optimization of M-PSK Cochannel Signals for a Narrowband Multiuser Detector", 2001 IEEE Pacific Rim Conference on Communications, Computer and Signal Processing, Victoria, B.C., Canada, Aug. 26-28, 2001, XP010560334.

Soong, A.C.K.; Krzymien, W.A.: "Performance of a Reference Symbol Assisted Multistage Successive Interference Cancelling Receiver in a Multicell CDMA Wireless System", Conference Record, Communication Theory Mini-Conference GlobeCom '95, IEEE Singapore Nov. 13-17, 1995, XP010159490.

Arslan, H; Molnar, K: "Iterative Co-channel Interference Cancellation in Narrowband Mobile Radio Systems", Emerging Technologies Symposium: Broadband, Wireless Internet Access, 2000 IEEE Apr. 10-11, 2000, Piscataway, New Jersey, US, XP010538900.

Mazzini Gianluca: "Power Division Multiple Access", Universal Personal Communications, 1998, ICUPC 1998, IEEE 1998, International Conference on Florence, Italy, Oct. 5-9, 1998, New York, NY, US, IEEE, US Oct. 5, 1998, pp. 543-546, XP010314962 ISBN: 0-7803-5106-1.

Saleh, A.A.M. et al.: "Adaptive Linearization of Power Amplifiers in Digital Radio Systems", Bell System Technical Journal, American Telephone and Telegraph Co., New York, US, vol. 62, No. 4, Part 1, Apr. 1, 1983, pp. 1019-1033, XP002028354.

Ramchandran, Kannan et al.: Multiresolution Broadcast for Digital HDTV Using Joint Source/Channel Coding, IEEE, vol. 11, No. 1, Jan. 1993, pp. 6-22.

Meyr, Heinrich et al.; "Digital Communication Receivers—Synchronization, Channel Estimation, and Signal Processing"; John Wiley & Sons, Inc.; 1998; pp. 212-213 and 217-218; XP 002364874.

Meyr, Heinrich et al.; "Digital Communication Receivers—Synchronization, Channel Estimation, and Signal Processing"; John Wiley & Sons, Inc.; 1998; pp. 610-612; XP 002364876.

Wolcott, Ted J. et al.; "Uplink-Noise Limited Satellite Channels"; IEEE 1995; pp. 717-721; XP-00580915.

Seskar, Ivan et al.; "Implementation Aspects for Successive Interface Cancellation in DS/CDMA Systems"; Wireless Networks; 1998; pp. 447-452.

Earth Station Technology; 1986; pp. 404-412; XP-002248387.

Chen, Ernest et al.; "DVB-S2 Backward-Compatible Modes: A Bridge Between the Present and the Future"; International Journal of Satellite Communications and Networking; vol. 22, Issue 3, pp. 341-365; published 2004 by John Wiley & Sons, Ltd.

Palicot, J., Veillard, J.; "Possible Coding and Modulation Approaches to Improve Service Availability for Digital HDTV Satellite Broadcasting at 22 GHz"; IEEE Transactions on Consumer Electronics; vol. 39, Issue 3; Aug. 1993; pp. 660-667.

U.S. Appl. No. 10/693,135, filed Oct. 24, 2003, Chen.

U.S. Appl. No. 10/532,632, filed Apr. 25, 2003, Chen et al.

U.S. Appl. No. 10/519,375, filed Dec. 22, 2004, Ernest C. Chen, Non-final Communication dated Dec. 27, 2007.

U.S. Appl. No. 10/913,927, filed Aug. 5, 2004, Ernest C. Chen, Non-final Communication dated Dec. 11, 2007.

U.S. Appl. No. 10/619,173, filed Jan. 2, 2007, Ernest C. Chen, Non-final Communication dated Nov. 15, 2007.

U.S. Appl. No. 10/532,631, filed Apr. 25, 2005, Paul. R. Anderson, Non-final Communication dated Nov. 19, 2007.

U.S. Appl. No. 10/691,032, filed Oct. 22, 2003, Weizheng Wang, Non-final Communication dated Nov. 16, 2007.

U.S. Appl. No. 10/519,322, filed Dec. 23, 2004, Ernest C. Chen, Notice of Allowance dated Dec. 11, 2007.

U.S. Appl. No. 10/532,619, filed Apr. 25, 2005, Ernest C. Chen, Notice of Allowance dated Dec. 26, 2007.

U.S. Appl. No. 10/532,632, filed Apr. 25, 2005, Ernest C. Chen, Notice of Allowance dated Jan. 7, 2008.

EPO Communication dated Mar. 11, 2008 in European conterpart Application No. 03777694.5 of corresponding U.S. Appl. No. 10/532,509 filed Oct. 17, 2003 by Ernest Chen et al., now issued as Patent No. 7,230,480.

EPO Communication dated Mar. 7, 2008 in European conterpart Application No. 03742393.6 of corresponding U.S. Appl. No. 10/519,375 filed Oct. 3, 2003 by Ernest Chen et al.

Scott, R. P. et al.; Ultralow Phase Noise Ti:sapphire Laser Rivals 100 MHz Crystal Oscillator; Nov. 11-15, 2001; IEEE-Leos; pp. 1-2.

Arslan, Huseyin and Molnar, Karl; "Co-channel Interference Cancellation with Successive Cancellation in Narrowband TDMA Systems"; Wireless Communications and Networking Conference; 2000 IEEE; Sep. 23-28, 2000; Piscataway, New Jersey, USA; vol. 3; pp. 1070-1074; XP010532692; ISBN: 0-7803-6596-8.

Non-final Communication dated May 31, 2007 in U.S. Patent Appl. No. 10/692,539 filed Oct. 24, 2003 by Ernest C. Chen.

Notice of Allowance dated Sep. 20, 2007 in U.S. Patent Appl. No. 10/692,539 filed Oct. 24, 2003 by Ernest C. Chen.

Notice of Allowance dated 11/653,517 in U.S. Appl. No. 11/653,517 filed Jan. 16, 2007 by Ernest C. Chen.

EPO Communication dated Aug. 3, 2007 in European counterpart application No. 03794510.2 of corresponding U.S. Appl. No. 10/236,414 filed Sep. 6, 2002 by Ernest C. Chen et al.

Norwegian Office Action dated Nov. 15, 2007 in Norwegian counterpart Application No. 20026115 of corresponding U.S. Appl. No. 09/844,401 filed Apr. 27, 2001 by Ernet C. Chen, now Patent No. 7,209,524.

Canadian Office Action dated Sep. 12, 2007 in Canadian counterpart Application No. 2491259 of corresponding U.S. Appl. No. 10/519,375 filed Jul. 3, 2003 by Ernest C. Chen et al.

Non-final Communication dated Mar. 3, 2008 in U.S. Appl. No. 11/656,662 filed Jan. 22, 2007 by Ernest C. Chen et al.

Non-final Office Communication dated Apr. 1, 2008 in U.S. Appl. No. 10/961,579 filed Oct. 8, 2004 filed Ernest C. Chen.

Notice of Allowance dated May 6, 2008 in U.S. Appl. No. 10/532,631 filed Apr. 25, 2005 by Paul R. Anderson et al.

Non-final Office Action dated Apr. 30, 2008 in U.S. Appl. No. 10/962,346 filed Oct. 8, 2004 by Ernest Chen.

EPO Communication dated Apr. 4, 2008 in European counterpart Application No. 03757359.9 corresponding to U.S. Appl. No. 10/165,710 filed Jun. 7, 2002 by Ernest Chen.

Notice of Allowance dated Mar. 12, 2008 in U.S. Appl. No. 11/655,001 filed Jan. 18, 2007 by Weizheng Wang et al.

Japanese Office Action dated Mar. 4, 2008 in Japanese counterpart Application No. 2004-297297 corresponding to U.S. Appl. No. 10/962,346 filed Oct. 8, 2004 by Ernest Chen.

EPO Communication dated Feb. 26, 2008 in European counterpart Application No. 04256234.8 corresponding to U.S. Appl. No. 10/962,346 filed Oct. 8, 2004 by Ernest Chen.

EPO Communication dated Feb. 7, 2008 in European counterpart Application No. 03742400.9 and received by Applicants from European representative on Feb. 14, 2008 and corresponding to U.S. Appl. No. 10/519,322 filed Dec. 23, 2004 by Ernest Chen et al.

Notice of Allowance dated May 8, 2008 in U.S. Appl. No. 11/619,173 filed Jan. 2, 2007 by Ernest Chen et al.

Notice of Allowance dated May 8, 2008 in U.S. Appl. No. 10/532,632 filed Apr. 25, 2005 by Ernest Chen et al.

Notice of Allowance dated Apr. 21, 2008 in U.S. Appl. No. 10/519,322 filed Dec. 23, 2004 by Ernest Chen et al.

Combarel, L. and Lavan, E.; "HD-SAT (Race 2075): HDTV Broadcasting over KA-Band Satellite, Cable and MMDS"; International Broadcasting Convention; 1994; pp. 633-640; XP006505143.

EPO Communication dated May 6, 2008 in European counterpart Application No. 03774848.0 corresponding to U.S. Appl. No. 10/532,582 filed Apr. 25, 2005 by Ernest C. Chen et al., now issued Feb. 6, 2007 as U.S. Patent No. 7,173,977.

EPO Communication dated May 6, 2008 in European counterpart No. 03777627.5 corresponding to U.S. Appl. No. 10/532,619 filed Apr. 25, 2005 by Ernest C. Chen.

Notice of Allowance dated May 22, 2008 in U.S. Appl. No. 10/532,619 filed Apr. 25, 2005 by Ernest C. Chen.

Final Rejection dated Jun. 24, 2008 in U.S. Appl. No. 10/519,375 filed Dec. 22, 2004 by Ernest C. Chen et al.

Non-Final Office Action dated Jun. 17, 2008 in U.S. Appl. No. 10/913,927 filed Aug. 5, 2004 by Ernest C. Chen.

European Search Report and Search Opinion dated Jun. 13, 2008 in European counterpart Application No. 07075745.5 corresponding to U.S. Appl. No. 09/844,401 filed Apr. 27, 2001 by Ernest C. Chen, now issued Apr. 24, 2007 as U.S. Patent No 7,209,524.

El-Gamal, Abbas and Cover, Thomas M.; "Multiple User Information Theory"; Proceedings of IEEE; vol. 68, No. 12; Dec. 1980; pp. 1466-1483; XP007904837.

Scalfart, Pascal; Leclerc, Michel; Fortier, Paul; Huynh Huu Tue; "Performance Analysis of a COFDM/FM In-band Digital Audio Broadcasting System"; IEEE Transactions on Broadcasting, IEEE Servive Center; Piscataway, New Jersey, USA; vol. 43, No. 2; Jun. 1, 1997; pp. 191-198; XP011006070.

Arslan, Huseyin and Molnar, Karl; "Successive Cancellation of Adjacent Channel Signals in FDMA/TDMA Digital Mobile Radio Systems"; Vehicular Technology Conference; 48th IEEE VTC; Ottawa, Canada; May 18-21, 1998; New York, New York, USA; vol. 3; May 18, 1998; pp. 1720-1724; XP010288123.

Canadian Office Action dated Apr. 22, 2008 in Canadian counterpart Application. No. 2502924 corresponding to U.S. Appl. No. 10/532,619 filed Apr. 25, 2005 by Ernest C. Chen.

Notice of Allowance dated Jun. 13, 2008 in U.S. Appl. No. 10/532,524 filed Apr. 25, 2005 by Ernest C. Chen et al.

Non-final Office Action dated Apr. 30, 2008 in U.S. Appl. No. 10/962,346 filed Oct. 8, 2004 by Ernest C. Chen.

EPO Summons to attend Oral Proceedings dated Jul. 18, 2008 in European counterpart Application No. 02728894.3 corresponding to U.S. Appl. No. 09/844,401 filed Apr. 27, 2001 by Ernest C. Chen, now issued Apr. 24, 2007 as US Patent No. 7,209,524.

* cited by examiner

DUAL LAYER SIGNAL PROCESSING IN A LAYERED MODULATION DIGITAL SIGNAL SYSTEM

CROSS-REFERENCE TO RELATED APPLICATIONS

This application is a continuation of Utility application Ser. No. 10/068,047, by Ernest C. Chen, Tiffany F. Furuya, Philip R. Hilmes, and Joseph Santoru, entitled "DUAL LAYER SIGNAL PROCESSING IN A LAYERED MODULATION SIGNAL SYSTEM," filed Feb. 5, 2002, now U.S. Pat. No. 7,173,981 which is a continuation-in-part application and claiming the benefit under 35 U.S.C. Section 120 of the following co-pending and commonly-assigned U.S. utility patent application, which is incorporated by reference herein:

Utility application Ser. No. 09/844,401, filed Apr. 27, 2001, now U.S. Pat. No. 7,209,524 by Ernest C. Chen, entitled "LAYERED MODULATION FOR DIGITAL SIGNALS".

This application is related to the following co-pending and commonly-assigned U.S. patent applications, which is incorporated by reference herein:

Application Ser. No. 10/068,039, filed Feb. 5, 2002, by Ernest C. Chen et al., entitled "PREPROCESSING SIGNAL LAYERS IN A LAYERED MODULATION DIGITAL SIGNAL SYSTEM TO USE LEGACY RECEIVERS".

This application is related to the following applications:

Application Ser. No. 11/653,517, entitled "LAYERED MODULATION FOR DIGITAL SIGNALS," filed on Jan. 16, 2007, by Ernest C. Chen, which is a continuation of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/165,710, entitled "SATELLITE TWTA ON-LINE NON-LINEARITY MEASUREMENT," filed on Jun. 7, 2002, by Ernest C. Chen, which is a continuation-in-part of application Ser. No. 09/844,401, entitled "LAYERED MODULATION FOR DIG ITAL SIGNALS," filed on Apr. 27, 2001, by Ernest C. Chen, now issued as U.S. Pat. No. 7,209,524;

Application Ser. No. 10/236,414, entitled "SIGNAL, INTERFERENCE AND NOISE POWER MEASUREMENT," filed on Sep. 6, 2002, by Ernest C. Chen and Chinh Tran, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/693,135, entitled "LAYERED MODULATION FOR ATSC APPLICATIONS," filed on Oct. 24, 2003, by Ernest C. Chan, which claims benefit to Provisional Patent Application 60/421,327, filed Oct. 25, 2002 and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/913,927, entitled "CARRIER TO NOISE RATIO ESTIMATIONS FROM A RECEIVED SIGNAL," filed on Aug. 5, 2004, by Ernest C. Chen, which is a continuation in part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 11/619,173, entitled "PREPROCESSING SIGNAL LAYERS IN LAYERED MODULATION DIGITAL SIGNAL SYSTEM TO USE LEGACY RECEIVERS," filed Jan. 2, 2007, which is a continuation of application Ser. No. 10/068,039, entitled "PREPROCESSING SIGNAL LAYERS IN LAYERED MODULATION DIGITAL SIGNAL SYSTEM TO USE LEGACY RECEIVERS,"filed on Feb. 5, 2002, by Ernest C. Chen, Tiffany S. Funiya, Philip R. Hilmes, and Joseph Santoru now issued as U.S. Pat. No. 7,245,671, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/693,421, entitled "FAST ACQUISITION OF TIMING AND CARRIER FREQUENCY FROM RECEiVED SIGNAL," filed on Oct. 24, 2003, by Ernest C. Chen, now issued as U.S. Pat. No. 7,151,807, which claims priority to Provisional Patent Application Ser. No. 60/421,292, filed Oct. 25, 2002, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/692,491, entitled "ONLINE OUTPUT MULTIPLEXER FILTER MEASUREMENT," filed on Oct. 24,2003, by Ernest C. Chen, which claims priority to Provisional Patent Application 60/421,290, filed Oct. 25, 2002, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/691,032, entitled "UNBLIND EQUALIZER ARCHITECTURE FOR DIGITAL COMMUNICATION SYSTEMS;" filed on Oct. 22, 2003, by Weizheng W. Wang, Tung-Sheng Lin, Ernest C. Chen, and William C. Lindsey, which claims priority to Provisional Patent Application Ser. No. 60/421,329, filed Oct. 25, 2002, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/962,346, entitled "COHERENT AVERAGING FOR MEASURING TRAVELING WAVE TUBE AMPLIFIER NONLINEARITY," filed on Oct. 8, 2004, by Ernest C. Chen, which claims priority to Provisional Patent Application Ser. No. 60/510,368, filed Oct. 10, 2003, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 11/655,001, entitled "AN OPTIMIZATION TECHNIQUE FOR LAYERED MODULATION," filed on Jan. 18, 2007, by Weizheng W Wang, Guancai Zhou, Tung-Sheng Lin, Ernest-C. Chen, Joseph Santoru, and William Lindsey, which claims priority to Provisional Patent Application 60/421,293, filed Oct. 25, 2002, and which is a continuation of application Ser. No. 10/693,140, entitled "OPTIMIZATION TECHNIQUE FOR LAYERED MODULATION," filed on Oct. 24, 2003, by Weizheng W. Wang, Guancai Zhou, Tung-Sheng Lin, Ernest C. Chen, Joseph Santoru, and William Lindsey, now issued as U.S. Pat. No. 7,184, 489, which is a continuation-in-part of application Ser. No. 09/844,401, entitled "AYERED MODULATION FOR DIGITAL SIGNALS," filed on Apr. 27, 2001, by Ernest C. Chen, now issued as U.S. Pat. No. 7,209,524;

Application Ser. No. 11/656,662, entitled "EQUALIZERS FOR LAYERED MODULATION AND OTHER SIGNALS," filed on Jan. 22, 2007, by Ernest C. Chon, Tung-Sheng Lin, Weizheng W. Wang. and William C. Lindsey, which claims priority to Provisional Patent Application 60/421,241, filed Oct. 25, 2002, and which is a continuation of application Ser. No. 10/691,133, entitled "EQUALIZERS FOR LAYERED MODULATED AND OTHER SIGNALS," filed on Oct. 22,2003, by Ernest C. Chen, Tung-Sheng Un, Weizheng W. Wang, and William C. Lindsey, now issued as U.S. Pat. No. 7,184,473, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/961,579, entitled "EQUALIZATION FOR TWTA NONLINEARITY MEASUREMENT" filed on Oct. 8, 2004, by Ernest C. Chen, which is a continuation-in-part of application Ser. No. 09/844,401, entitled "LAYERED MODUlATION FOR DIGITAL SIGNALS," filed on Apr. 27, 2001, by Ernest C. Chen, now issued as U.S. Pat. No. 7,209,524;

Application Ser. No. 10/532,632, entitled "LOWER COMPLEXITY LAYERED MODULATION SIGNAL PROCESSOR," flied on Apr. 25, 2005, by Ernest C. Chen, Weizheng W. Wang, Tung-Sheng Lin, Guangcai Zhou, and Joseph Santoru, which is a National Stage Application of PCT US03/32264, filed Oct. 10, 2003, which claims priority to Provisional Patent Application 60/421,331, entitled "LOWER COMPLEXITY LAYERED MODULATION SIGNAL PROCESSOR," filed Oct. 25, 2002, by Ernest C. Chen, Weizheng W. Wang, Tung-Sheng Lin, Guangcai Zhou, and Joseph Santoru, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/532,631, entitled "FEEDER LINK CONFIGURATIONS TO SUPPORT LAYERED MODULATION FOR DIGITAL SIGNALS," filed on Apr. 25, 2005, by Paul R. Anderson, Joseph Santoru and Ernest C. Chen, which is a National Phase Application of PCT US03/33255, filed Oct. 20, 2003, which claims priority to Provisional Parent Application 60/421,328, entitled "FEEDER LINK CONFIGURATIONS TO SUPPORT LAYERED MODULATION FOR DIGITAL SIGNALS," filed Oct. 25, 2002, by Paul K. Anderson, Joseph Santoru and Ernest C. Chen, and which is a continuation-in-part of application Ser. No. 09/844,401, entitled "LAYERED MODULATION FQR DIGITAL SIGNALS," filed on Apr. 27, 2001, by Ernest C. Chen, now issued as U.S. Pat. No. 7,209,524;

Application Ser. No. 10/532,619, entitled "MAXIMIZING POWER AND SPECTRAL EFFICIENCIES FOR LAYERED AND CONVENTIONAL MODULATIONS," filed on Apr. 25, 2005, by Ernest C. Chen, which is a National Phase Application of PCT Application US03/32800, filed Oct. 16, 2003, which claims priority to Provisional Patent Application 60/421,288, entitled "MAXIMIZING POWER AND SPECTRAL EFFICIENCIES FOR LAYERED AND CONVENTIONAL MODULATION," filed Oct. 25,2002, by Ernest C. Chen and which is a continuation-in-part of application Ser. No. 09/844,401, entitled "LAYERED MODULATION FOR DIGITAL SIGNALS;" filed on Apr. 27,2001, by Ernest C. Chen, now issued as U.S. Pat. No. 7,209,524, Application Ser. No. 10/532,524, entitled "AMPLITUDE AND PHASE MATCHING FOR LAYERED MOD ULATION RECEPTION," filed on Apr. 25, 2005, by Ernest C. Chen, jeng-Hong Chen, Kenneth Shurn, and Joungheon Oh, which is a National Phase Application of PCT Application US03/31199, filed Oct. 3, 2003, which claims priority to Provisional Patent Application 60/421,332, entitled "AMPLITUDE AND PHASE MATCHING FOR LAYERED MODULATION RECEPTION," filed Oct. 25, 2002, by Ernest C. Chen, Jeng-Hong Chen, Kenneth Shum, and Joungheon Oh, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524, and also claims priority to;

Application Ser. No. 10/532,582, entitled "METHOD AND APPARATUS FOR TAILORING CARRIER POWER REQUIREMENTS ACCORDING TO AVAILABILiTY IN LAYERED MODULATION SYSTEMS," filed on Apr. 25, 2005, by Ernest C. Chen, Paul K. Anderson and Joseph Santoru, now issued as U.S. Pat. No. 7,173,977, which is a National Stage Application of PCT Application US03/32751, filed Oct. 15, 2003, which claims priority to Provisional Patent Application 60/421,333, entitled "METHOD AND APPARATUS FOR TAILORING CARRIER POWER REQUIREMENTS ACCORDING TO AVAILABILITY IN LAYERED MODULATION SYSTEMS," filed Oct. 25, 2002, by Ernest C. Chen, Paul R. Anderson and Joseph Santoru, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/532,509, entitled "ESTIMATING THE OPERATING POINT ON A NONLINEAR TRAVELING WAVE TUBE AMPLIFIER," filed on Apr. 25, 2005, by Ernest C. Chen and Shamik Maitra, now issued as U.S. Pat. No. 7,230,480, which is a National Stage Application of PCT Application US03/33130 filed Oct. 17, 2003, and which claims priority to Provisional Patent Application 60/421,289, entitled "ESTIMATING THE OPERATING POINT ON A NONLINEAR TRAVELING WAVE TUBE AMPLIFIER," filed Oct. 25, 2002, by Ernest C. Chen and Shamik Maitra, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/519,322, entitled "IMPROVING HIERARCHICAL 8PSK PERFORMANCE," filed on Dec. 23, 2004 by Ernest C. Chen and Joseph Santoru, which is a National Stage Application of PCT US03/020862 filed Jul. 1, 2003, which claims priority to Provisional Patent Application 60/392,861, filed Jul. 1, 2002 and Provisional Patent Application 60/392,860, filed Jul. 1, 2002, and which is also related to application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/519,375, entitled "METHOD AND APPARATUS FOR LAYERED MODULATION," filed on Jul. 3, 2003, by Ernest C. Chen and Joseph Santoru, which is a National Stage Application of PCT US03/20847, filed Jul. 3, 2003, which claims priority to Provisional Patent Application 60/393,437 filed Jul. 3, 2002, and which is related to application Ser. No. 09/844,401, entitled "LAYERED MODULATION FOR DIGITAL SIGNALS," filed on Apr. 27, 2001, by Ernest C. Chen, now issued as U.S. Pat. No. 7,209,524; and Application Ser. No. 10/692,539, entitled "ON-LINE PHASE NOISE MEASUREMENT FOR LAYERED MODULATION", filed Oct. 24, 2003, by Ernest C. Chen, which claims priority from Provisional Patent Application 60/421,291, filed Oct. 25, 2002, entitled "ON-LINE PHASE NOISE MEASUREMENT FOR LAYERED MODULATION".

BACKGROUND OF THE INVENTION

1. Field of the Invention

The present invention relates generally to systems for receiving digital signals, and in particular, to systems for receiving layered modulation in digital signals.

2. Description of the Related Art

As various digital signal communication systems and services evolve, there is a burgeoning demand for increased data throughput and added services. However, it is more difficult to implement improvements in old systems and new services when it is necessary to replace existing legacy hardware, such as transmitters and receivers. New systems and services are advantaged when their appearance does not render legacy hardware obsolete. In the realm of wireless communications, this principle is further highlighted by the limited availability of electromagnetic spectrum. Thus, it is not possible (or at least not practical) to merely transmit enhanced or additional data at a new frequency.

The conventional method of increasing spectral capacity is to move to a higher-order modulation, such as from quadrature phase shift keying (QPSK) to eight phase shift keying (8PSK) or sixteen quadrature amplitude modulation (16QAM). Unfortunately, QPSK receivers cannot demodulate 8PSK or 16QAM signals. As a result, legacy customers with QPSK receivers must upgrade their receivers in order to continue to receive any signals transmitted with an 8PSK or 16QAM modulation.

Layered modulation enables systems and methods of transmitting signals to accommodate enhanced and increased data throughput without requiring additional frequency bands. Systems using layered modulation can provide enhanced and increased throughput signals for new receivers while remaining compatible with legacy receivers. Newer layered modulation techniques (such as detailed in U.S. patent application Ser. No. 09/844,401, filed Apr. 27, 2001, and entitled "LAYERED MODULATION FOR DIGITAL SIGNALS) also provide the unique advantage of allowing transmission signals to be upgraded from a source separate from the legacy transmitter. In other words, the layered signals can be asynchronous and/or non-coherent.

Related receiver systems for layered signals have also been described, such as those found in U.S. Pat. No. 4,039,961, which is incorporated by reference herein. However, such receiver systems are based on analog circuits, synchronized by a voltage control oscillator. In addition, such receiver systems are limited because they are designed to only receive coherent layered signals, i.e. signals that are synchronously produced.

Furthermore, because additional signal processing usually introduces unwanted noise, it is also important to minimize the amount of processing performed on a received signal. A single processor which accommodates high speed decoding of the multiple layers introduces a minimum of additional noise. A processor that can demodulate and decode a layered signal into distinct signal layers, enables separate downstream transports (e.g. MPEG decoders) to directly receive less noisy signals.

There is a need for systems and methods for receiving and processing the layered modulation signals. There is also a need for systems and methods for decoding layered signals digitally. There is further a need for a single integrated processor for decoding distinct signals of a layered signal. The present invention meets these needs.

SUMMARY OF THE INVENTION

The present invention provides a flexible and expandable apparatus that can be implemented with high speed logic circuit capable of performing demodulator functions and processing of received layered modulation signals in real-time. The invention utilizes high speed digitization of the incoming signal to prepare it for further high speed digital processing. The digital processing demodulates and decodes the distinct layers of layered signal. The invention enables a receive system architecture wherein the incoming layered signal is processed by a single decoder to produce distinct layer signals for further decoding, thereby minimizing signal noise and cost. The processor can be included in a single integrated receiver/decoder (IRD) further comprising a separate transport for each decoded signal layer.

An exemplary apparatus comprises a tuner for receiving a layered signal and producing a layered in-phase signal and a layered quadrature signal therefrom, an analog-to-digital converter for digitizing the layered in-phase signal and the layered quadrature signal and a processor for decoding the layered in-phase signal and the layered quadrature signal to produce one or more discrete layer signals.

In one embodiment, the invention comprises one or more transports, such as for MPEG decoders, each receiving and decoding one of the one or more discrete layer signals to be displayed.

The high speed digital processor performs many functions in decoding the signal layers. The processor demodulates and decodes the upper layer from the layered in-phase signal and the layered quadrature signal to produce the upper layer signal for a video transport. The processor also produces an ideal upper layer signal including an ideal in-phase upper layer signal and an ideal quadrature upper layer signal from the decoded upper layer signal and subtracts these from the layered in-phase signal and the layered quadrature signal, respectively, to produce the lower layer in-phase signal and the lower layer quadrature signal of the lower signal layer. The layered in-phase signal and the layered quadrature signal can be delayed to synchronize the subtraction. Delaying the layered in-phase signal and the layered quadrature signal can be done by correlating the demodulated upper layer signal to the ideal upper layer signal to determine the proper delay.

After the lower layer signal is produced by the subtraction, the processor further demodulates and decodes the lower layer in-phase signal and the lower layer quadrature signal to produce the lower layer signal for a video transport. In doing so, the processor can match filter the lower layer in-phase signal and the lower layer quadrature signal.

In other embodiments, generating the ideal upper layer signals can comprise advanced signal processing. For example, processor can apply a signal map to the ideal in-phase upper layer signal and the ideal quadrature upper layer signal, the signal map accounting for transmission distortions of the layered signal. The signal processing can also comprise pulse shaping the ideal in-phase upper layer signal and the ideal quadrature upper layer signal. Signal processing can also comprise amplitude and phase matching the ideal in-phase upper layer signal and the ideal quadrature upper layer signal with the layered in-phase signal and the layered quadrature signal, respectively.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

1. Overview

The present invention provides for the reception of non-coherent layered modulation signals using legacy and multi-layer receivers. The signal layers can be independently modulated and coded. The layered signal is passed through a high speed digitizer to prepare it for digital processing. Processing the digitized layered signal yields the distinct layer signals which can then be presented to separate transports for conversion to a video signal.

2. Layered Signals

Figure 1A:
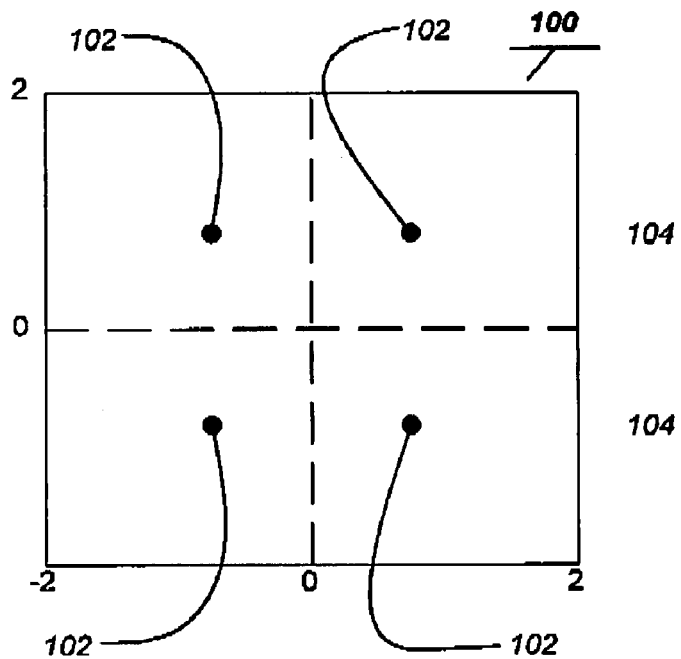
FIGS. 1A-1C illustrate the relationship of signal layers in a layered modulation transmission.
Figure 1B:
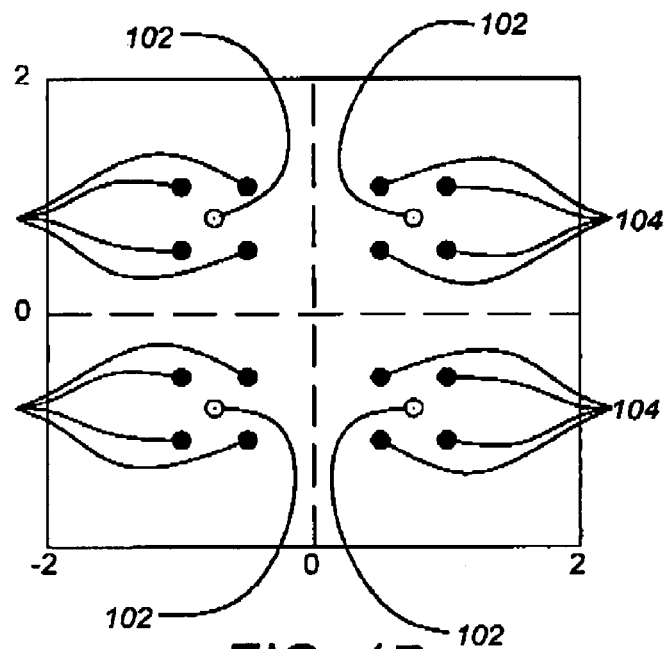
Figure 1C:
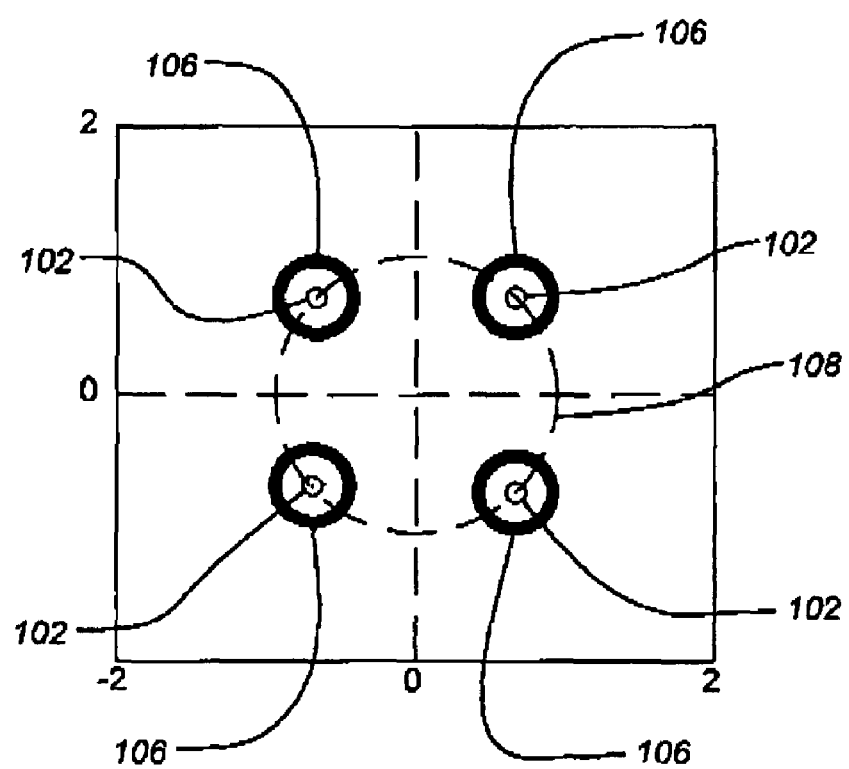

FIGS. 1A-1C illustrate the basic relationship of signal layers in a layered modulation transmission. FIG. 1A illustrates a upper layer signal constellation 100 of a transmission signal showing the signal points or symbols 102. FIG. 1B illustrates the lower layer signal constellation of symbols 104 over the upper layer signal constellation 100 where the layers are coherent. FIG. 1C illustrates a lower signal layer 106 of a second transmission layer over the upper layer constellation where the layers may be non-coherent. The lower layer 106 rotates about the upper layer constellation 102 due to the relative modulating frequencies of the two layers in a non-coherent transmission. Both the upper and lower layers rotate about the origin due to the upper layer modulation frequency as described by path 108.

Figure 2A:
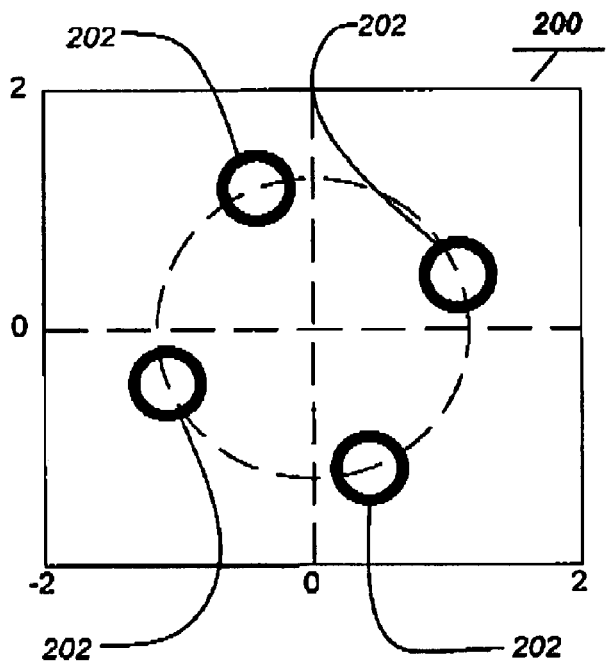
FIGS. 2A-2C illustrate a signal constellation of a second transmission layer over a first transmission layer non-coherently.
Figure 2B:
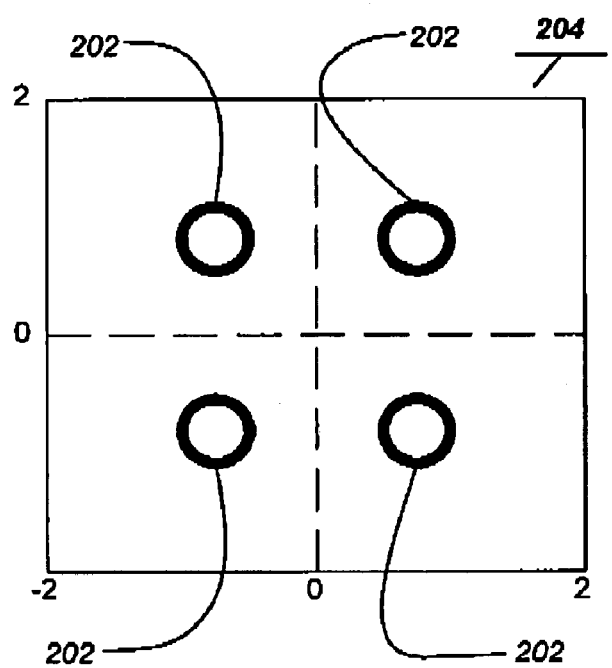
Figure 2C:
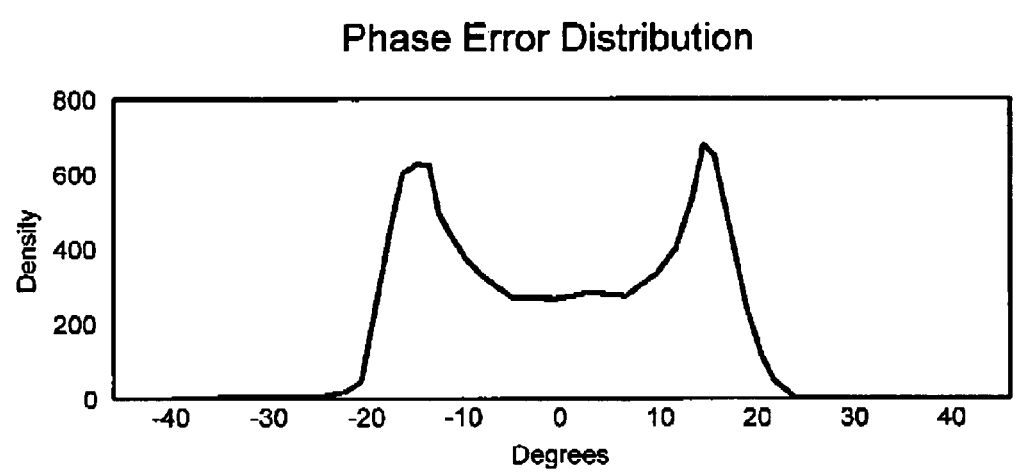

FIGS. 2A-2C illustrate a signal constellation of a lower transmission layer over the upper transmission layer after upper layer demodulation. FIG. 2A shows the constellation 200 before the upper carrier recovery loop (CRL) and FIG. 2B shows the constellation 204 after CRL. In this case, the signal points of the lower layer are rings 202. FIG. 2C depicts a phase distribution of the received signal with respect to nodes 102. As mentioned above, relative modulating frequencies cause the lower layer constellation to rotate around the nodes of the upper layer constellation. After the lower layer CRL this rotation is eliminated. The radius of the lower layer constellation is determined by its power level. The thickness of the rings 202 is determined by the carrier to noise ratio (CNR) of the lower layer.

Figure 3:
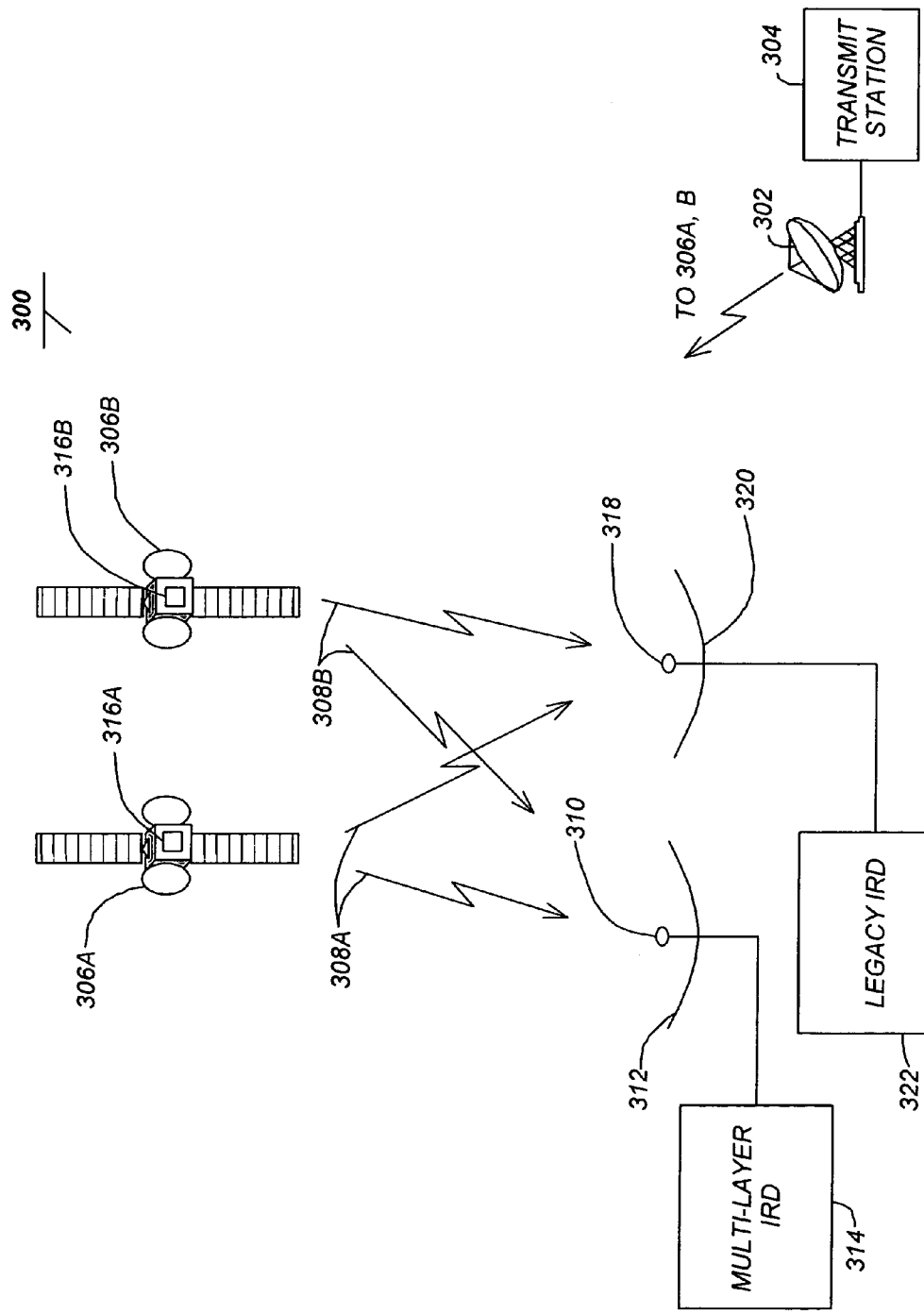
FIG. 3 is a block diagram for a typical transmission system for a receiver of the invention.

FIG. 3 is a block diagram for a typical system 300 of transmitting and receiving layered signals, with at least one of the signals being a legacy signal and the others including a non-legacy signal. Separate transmitters 316A, 316B, as may be located on any suitable platform, such as satellites 306A, 306B, are used to non-coherently transmit different layers of a signal of the present invention. They may also exist on the same platform. Uplink signals are typically transmitted to each satellite 306A, 306B from one or more transmit stations 304 via an antenna 302. The layered signals 308A, 308B (downlink signals) are received at receiver antennas 312, 320, such as satellite dishes, each with a low noise block (LNB) 310, 318 where they are then coupled to integrated receiver/decoders (IRDs) 314, 322.

One IRD 322 is legacy device which only discerns the upper layer (legacy signal) of the layered signals 308A, 308B. It demodulates and decodes the upper layer and ignores the lower layer (non-legacy signal) as noise. The other IRD 314 is capable of demodulating and decoding both layers of the layered signals 308A, 308B, with an integrated layered modulation decoder which will be detailed hereafter. It should be noted that antennas 312, 320 can each comprise more than one directional receiving dish to receive layered signals 308A, 308B from separate satellites as will be detailed in the receiver system described hereafter.

Because the signal layers may be transmitted non-coherently, separate transmission layers may be added at any time using different satellites 306A, 306B or other suitable platforms, such as ground based or high altitude platforms. Thus, any composite signal, including new additional signal layers will be backwards compatible with legacy receivers which will disregard the new signal layers. To ensure that the signals are distinguishable, the combined signal and noise level for the lower layer must be at or below the allowed noise floor for the upper layer. Alternate receiver systems employing the invention described here can be constructed to decode signals having more than two signal layers.

3. Reciever System

Figure 4:
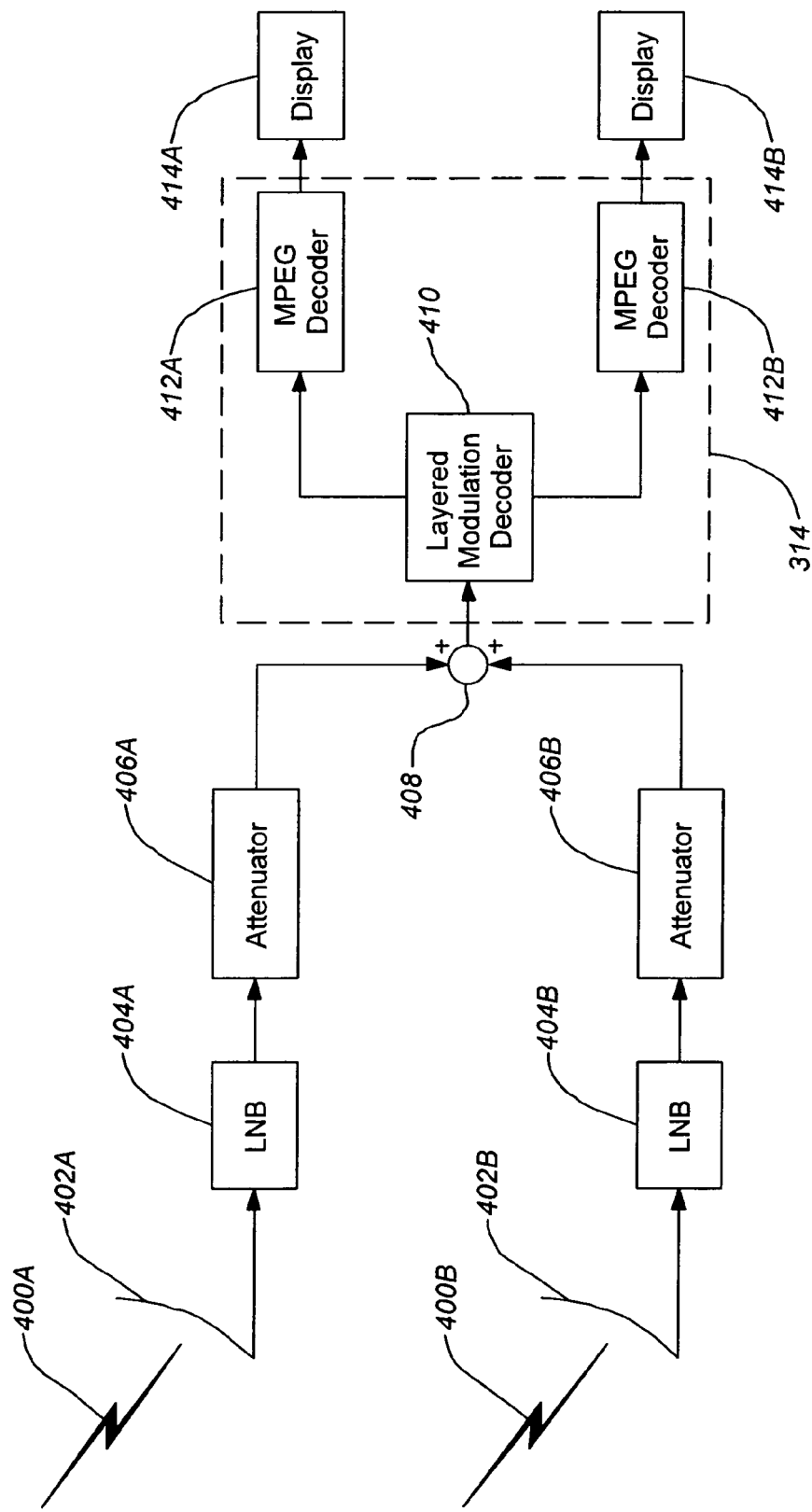
FIG. 4 is a block diagram of a receiving architecture of the invention.

FIG. 4 is a block diagram of a receiving architecture for testing the invention method. Emulated layered signals 400A, 400B are received by receiving dishes 402A, 402B (which can alternately be combined in a single dish with a single LNB). The signals 400A, 400B can each be transmitted by distinct transmitters from separate satellites, but they exist in interfering frequency bands, e.g. 12.5 GHz. The received layered signals 400A, 400B are then directed through respective low noise blocks (LNBs) 404A, 404B and attenuators 406A, 406B. The LNBs 404A, 404B convert each of the received layered signals 400A, 400B to an intermediate frequency range, e.g. 950-1450 MHz. The layered signals are combined at the summation block 408, with their relative power levels adjusted by the attenuators 406A, 406B.

It should be noted that the details regarding the reception of the layered signal up to the summation block 408 are not critical to the operation of the invention and shown only as one example. Many designs are possible. For example, as previously mentioned, the same receiver dish can be used for both layered signals 400A, 400B. Two acceptably interfering layered signals provided at the same input is all that is required for the invention to function.

The combined layered signals 400A, 400B are input to a layered modulation decoder 410 of the invention. The decoder processes the layered signals 400A, 400B to separate the layered signals 400A, 400B into two distinct signals, one for each layer. The distinct signals are each input to separate transports 412A, 412B (e.g. MPEG decoders) for further processing to produce separate video signals. The video signals are then communicated to displays 414A, 414B. Of course, alternate architectures can employ a single display 414 switched between the transports 412A, 412B. Similarly, a single transport 412 can be employed, switched between the two signal layer outputs of the layered modulation decoder 410. The layered modulation decoder 410 and video transports 412A, 412B can all be combined as part of a stand alone IRD 314 for receiving and decoding both layered signals.

4. Layered Modulation Decoder

Figure 5:
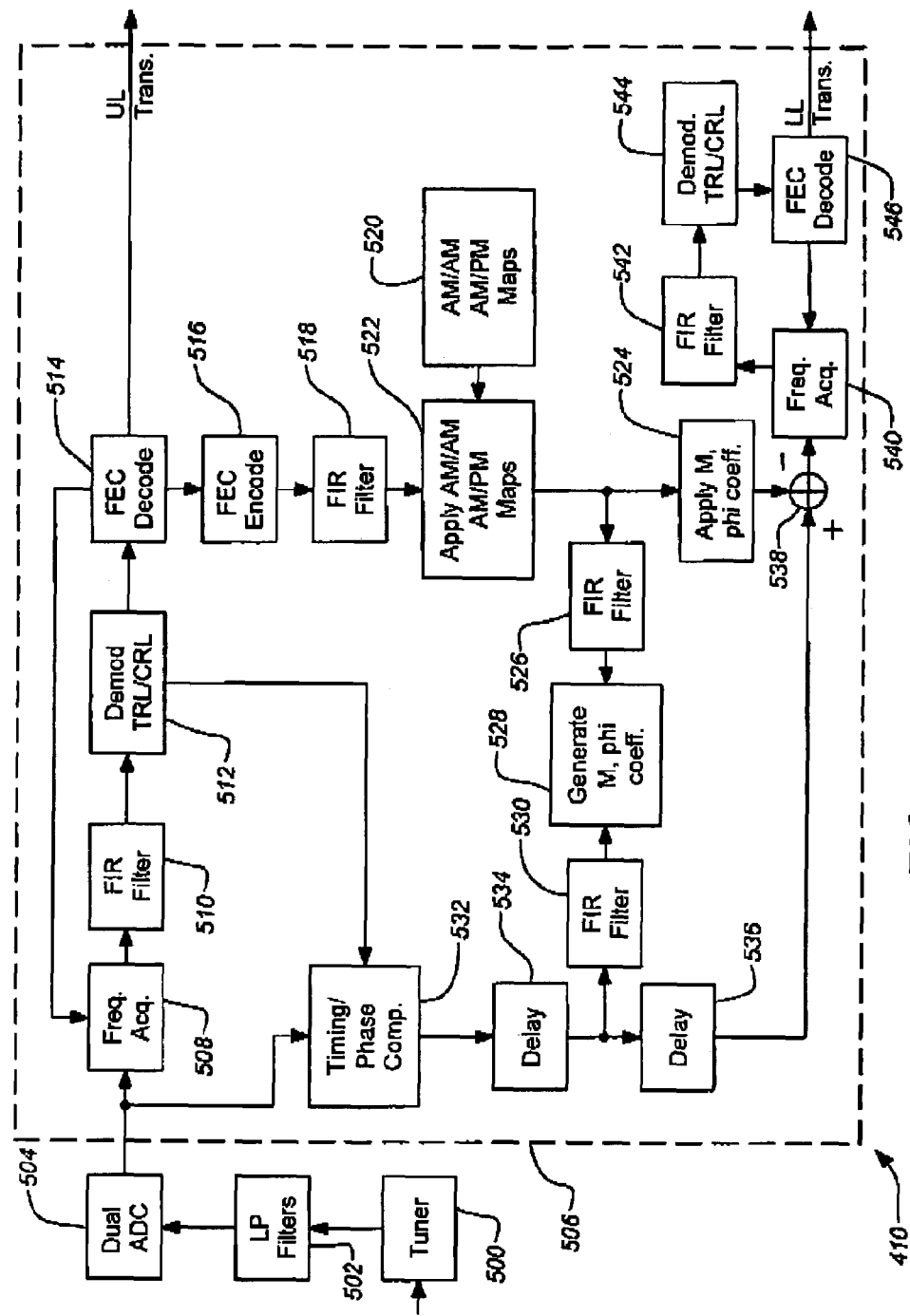
FIG. 5 is a block diagram of a layered modulation decoder of the invention.

FIG. 5 is a block diagram of a layered modulation decoder 410 of the invention. The layered modulation decoder 410 decodes both layers of an incoming layered signal to yield a separate signal for each layer, as previously discussed.

The incoming layered signal is first tuned to convert it to a baseband in-phase (I) and quadrature (Q) signal by tuner 500. The separate signals can then be filtered by a low pass filter 502 in preparation for digitizing. The signals are then digitized at a high sampling rate and sufficient resolution by an analog-to-digital converter (ADC) 504. A dual channel ADC 504 or separate ADCs can be used for the separate in-phase and quadrature signals. The digitized signals are then communicated to a processor 506.

The processor 506 for extracting a lower layer signal can be implemented as a logic circuit. The entering digitized in-phase and quadrature signals can be first split into two paths. On the signal path for the upper layer, the in-phase and quadrature signals can first be passed through a frequency acquisition loop 508. They can then be filtered through a finite impulse response (FIR) matched filter 510. A demodulator 512 demodulates the signals, with carrier and timing recovery loops, and produces demodulated layered in-phase and quadrature signals. The demodulated signals are then decoded by decoder 514 which can incorporate Viterbi decoding, deinterleaving and Reed-Solomon (RS) decoding functions as appropriate to accurately determine the upper layer symbols. The decoded upper layer symbol signal can then be output from the processor 506, where it can be communicated to a transport 412A and subsequently converted to video.

Back in the processor 506, the decoded upper layer symbol signal is also applied to an encoder 516 in order to produce an ideal upper layer signal (i.e. an upper layer signal transmitted without the noise and interference of the lower layer signal). The encoded signal is again produced as in-phase and quadrature signal components. A variety of signal processing techniques can be applied to these signals to produce the ideal upper layer.

The ideal upper layer signal can be filtered through an FIR matched filter 518. Characteristics of the transmission (e.g. amplifier nonlinearities, etc.) can be accounted for by signal maps 520, such as an amplitude modulation to amplitude modulation map (AM/AM) map and/or an amplitude modulation to phase modulation map (AM/PM). The signal maps 520 are applied 522 to the encoded signals to simulate downlink transmission of an upper layer signal. These signal maps 520 can be updated to account for changes in the transmission characteristics of the satellite. Similarly, a pulse shaping function 526 (one example being an FIR matched filter) can also be applied after accounting for the transmission characteristics (by applying 522 the signal maps). In addition, an upper layer amplitude and phase matching function 528, driven by the demodulated layered signal and the ideal reconstructed upper layer signals, can be used to generate matching coefficients. The matching coefficients are applied 524 to the reconstructed upper layer signal to ensure that it is appropriately scaled in magnitude and rotated in phase as compared to the layered signal, for maximum cancellation in the final signal subtraction.

Ultimately, the ideal reconstructed in-phase and quadrature signals for the upper layer are subtracted from the layered in-phase and quadrature signals that are produced by the demodulator at a subtractor 538. A timing and phase compensation function 532 is applied to the second layered path entering the processor 506, using information from the demodulator 512. A fixed delay 534 can be applied to the second layered signal path to determine the appropriate delay to align the layered and ideal signals to generate matching coefficients 528. The delayed layered signal is split and, in one path, an FIR matched filter 530 can be applied to it before generating matching coefficients 528. The second delayed layered signal path is delayed 536 again to align it appropriately with the ideal upper layer signal for subtraction 538. The results of the subtraction are the in-phase and quadrature signals of the lower layer.

The in-phase and quadrature signals of the lower layer are then translated into the proper signal format for a transport 412B to convert to video. The lower layer signal undergoes frequency acquisition 540 and a digital filter 542 (e.g. an FIR matched filter) can operate on the signals. The signals can then be demodulated at demodulator 544, to have the lower carrier removed in this case. Finally the demodulated in-phase and quadrature signals can be appropriately decoded by decoder 546 to produce a signal compatible with the video transport 412.

Figure 6:
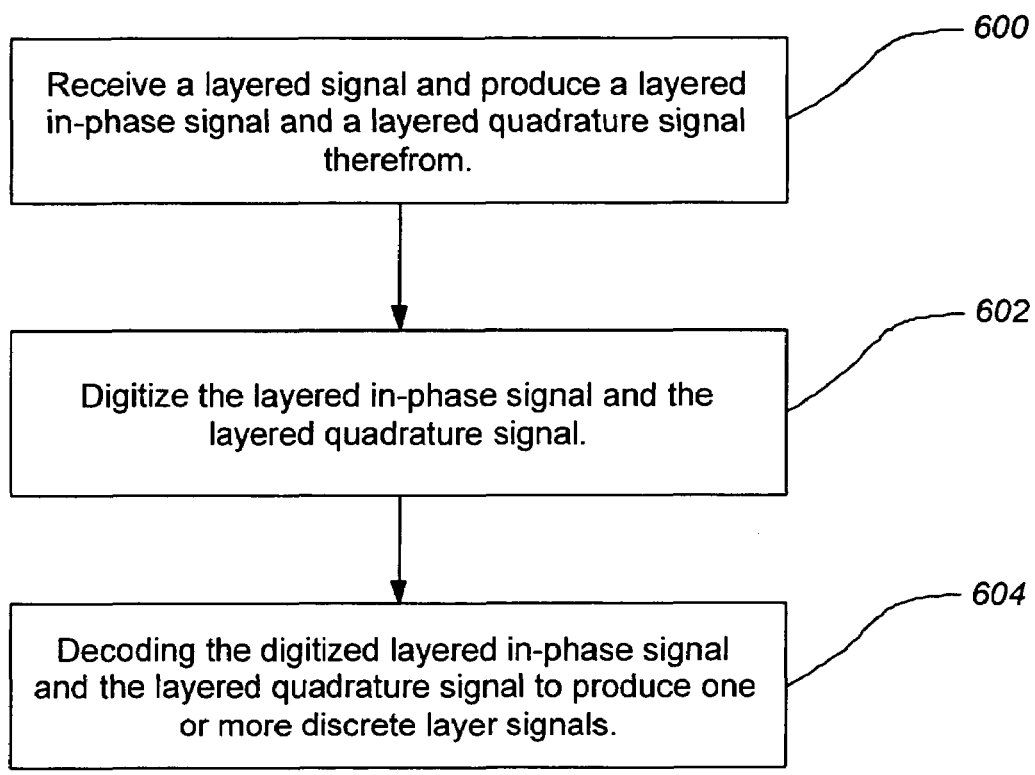
FIG. 6 describes a method of a layered modulation decoding according to the invention.

FIG. 6 describes a method of a layered modulation decoding according to the invention. At block 600, a layered signal is received and a layered in-phase signal and a layered quadrature signal are produced therefrom. At block 602, the layered in-phase signal and the layered quadrature signal are digitized. Finally, at block 604, the digitized layered in-phase signal and the layered quadrature signal are decoded to produce one or more discrete layer signals. An upper layer signal is demodulated and decoded from the layered in-phase signal and the layered quadrature signal to produce an upper one of the one or more discrete layer signals. An ideal upper layer signal including an ideal in-phase upper layer signal and an ideal quadrature upper layer signal are produced from the decoded upper layer signal and subtracted from the layered in-phase signal and the layered quadrature signal, respectively, to produce a lower layer in-phase signal and a lower layer quadrature signal of a lower one of the one or more discrete layer signals. The layered in-phase signal and the layered quadrature signal are delayed to synchronize the subtraction. Delaying the signals comprises correlating the layered in-phase signal and the layered quadrature signal are delayed by to the ideal in-phase upper layer signal and the ideal quadrature upper layer signal.

5. Conclusion

The foregoing description including the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. A method of transmitting a coded signal having an upper layer signal and a lower layer signal, comprising the steps of:
    combining the upper layer signal and the lower layer signal;
    encoding the combined upper layer signal and lower layer signal;
    assigning first symbols to the upper layer signal portion of the encoded combined upper layer signal and the lower layer signal;

assigning second symbols to the lower layer signal portion of the encoded combined upper layer signal and the lower layer signal;

delaying the first symbols;

mapping and modulating the delayed first symbols;

mapping and modulating the second symbols;

transmitting the delayed mapped and modulated first symbols; and transmitting the mapped and modulated second symbols.

2. The method of claim 1, wherein the step of encoding the combined upper layer signal and lower layer signal further comprises the step of inserting timing data into the encoded combined upper layer signal and lower layer signal, the timing data including predetermined lower layer signal data.

3. The method of claim 2, wherein the timing data includes blocks of initialization data.

4. The method of claim 2, wherein the timing data is inserted periodically.

5. The method of claim 1, wherein the step of encoding the combined upper layer signal and lower layer signal further comprises the step of inserting timing data into at least a portion of the upper layer signal and into the lower layer signal.

6. The method of claim 5, wherein the timing data includes blocks of initialization data.

7. The method of claim 5, wherein the timing data is inserted periodically.

8. The method of claim 1, wherein the upper layer signal is delayed by an amount of time necessary for a receiver of the transmitted coded signal to remodulate and re-encode a demodulated upper layer signal.

9. An apparatus for transmitting a coded signal having an upper layer signal and a lower layer signal, comprising:

means for combining the upper layer signal and the lower layer signal;

means for encoding the combined upper layer signal and lower layer signal;

means for assigning first symbols to the upper layer signal portion of the encoded combined upper layer signal and the lower layer signal;

means for assigning second symbols to the lower layer signal portion of the encoded combined upper layer signal and the lower layer signal;

means for delaying the first symbols;

means for mapping and modulating the delayed first symbols;

means for mapping and modulating the second symbols;

transmitting the delayed mapped and modulated first symbols; and means for transmitting the mapped and modulated second symbols.

10. The apparatus of claim 9, wherein the means for encoding the combined upper layer signal and lower layer signal further comprises means for inserting timing data into the encoded combined upper layer signal and lower layer signal, the timing data including predetermined lower layer signal data.

11. The apparatus of claim 10, wherein the timing data includes blocks of initialization data.

12. The apparatus of claim 10, wherein the timing data is inserted periodically.

13. The apparatus of claim 9, wherein the means for encoding the combined upper layer signal and lower layer signal further comprises means for inserting timing data into at least a portion of the upper layer signal and into the lower layer signal.

14. The apparatus of claim 13, wherein the timing data includes blocks of initialization data.

15. The apparatus of claim 13, wherein the timing data is inserted periodically.

16. The apparatus of claim 9, wherein the upper layer signal is delayed by an amount of time necessary for a receiver of the transmitted coded signal to remodulate and re-encode a demodulated upper layer signal.

17. An apparatus for transmitting a coded signal having an upper layer signal and a lower layer signal, comprising:

an encoder, for encoding a combined upper layer signal and lower layer signal;

a first symbol assigner, for assigning first symbols to the upper layer signal portion of the encoded combined upper layer signal and the lower layer signal;

a second symbol assigner, for assigning second symbols to the lower layer signal portion of the encoded combined upper layer signal and the lower layer signal;

a delay element, communicatively coupled to the first symbol assigner, for delaying the first symbols;

a first mapper and modulator, for mapping and modulating the delayed first symbols;

a second mapper and modulator, for mapping and modulating the second symbols;

a transmitter, communicatively coupled to the first mapper and modulator, for transmitting the delayed mapped and modulated first symbols; and a second transmitter, communicatively coupled to the second mapper and modulator, for transmitting the mapped and modulated second symbols.

18. The apparatus of claim 17, wherein the encoder inserts timing data into the encoded combined upper layer signal and lower layer signal, the timing data including predetermined lower layer signal data.

19. The apparatus of claim 18, wherein the timing data includes blocks of initialization data.

20. The apparatus of claim 18, wherein the timing data is inserted periodically.

21. The apparatus of claim 17, wherein the encoder inserts timing data into at least a portion of the upper layer signal and into the lower layer signal.

22. The apparatus of claim 21, wherein the timing data includes blocks of initialization data.

23. The apparatus of claim 21, wherein the timing data is inserted periodically.

24. The apparatus of claim 17, wherein the upper layer signal is delayed by an amount of time necessary for a receiver of the transmitted coded signal to remodulate and re-encode a demodulated upper layer signal.

25. A method of decoding a coded input signal having an upper layer modulated signal and a lower layer modulated signal, comprising the steps of:

demodulating the input signal to produce an upper layer signal;

delaying the input signal;

demodulating the delayed input signal to produce a lower layer signal;

combining the upper layer signal and the lower layer signal; and decoding the combined upper layer signal and the lower layer signal.

26. The method of claim 25, wherein:

the coded input signal includes initialization data having predetermined lower layer signal data; and the combined upper layer signal and the lower layer signal are decoded according to the initialization data.

27. The method of claim 25, wherein:
at least a portion of the coded input signal includes a separately encoded upper layer signal and lower layer signal; and
the at least a portion of the coded input signal is decoded according to the initialization data.

28. The method of claim 25, wherein the step of demodulating the delayed input signal to produce a lower layer signal comprises the steps of:
re-encoding and remodulating the upper layer signal;
extracting the lower layer signal from the input signal by subtracting the re-encoded and remodulated upper layer signal from the input signal.

29. The method of claim 28, wherein the input signal is delayed by an amount of time necessary to re-encode and remodulate the upper layer signal.

30. The method of claim 25, further comprising the step of de-interleaving the decoded combined upper layer signal and the lower layer signal.

31. An apparatus for decoding a coded input signal having an upper layer modulated signal and a lower layer modulated signal, comprising:
means for demodulating the input signal to produce an upper layer signal;
means for delaying the input signal;
means for demodulating the delayed input signal to produce a lower layer signal;
means for combining the upper layer signal and the lower layer signal; and
means for decoding the combined upper layer signal and the lower layer signal.

32. The apparatus of claim 31, wherein:
the coded input signal includes inserted initialization data having predetermined lower layer signal data; and
the combined upper layer signal and the lower layer signal are decoded according to the initialization data.

33. The apparatus of claim 31, wherein:
at least a portion of the coded input signal includes a separately encoded upper layer signal and lower layer signal; and
the at least a portion of the coded input signal is decoded according to the initialization data.

34. The apparatus of claim 31, wherein the means for demodulating the delayed input signal to produce a lower layer signal comprises:
means for re-encoding and remodulating the upper layer signal;
means for extracting the lower layer signal from the input signal by subtracting the re-encoded and remodulated upper layer signal from the input signal.

35. The apparatus of claim 34, wherein the input signal is delayed by an amount of time necessary to re-encode and remodulate the upper layer signal.

36. The apparatus of claim 31, further comprising the step of de-interleaving the decoded combined upper layer signal and the lower layer signal.

37. An apparatus for decoding a coded input signal having an upper layer modulated signal and a lower layer modulated signal, comprising:
a demodulator for demodulating the input signal to produce an upper layer signal;
a delay element, communicatively coupled to the input signal for delaying the input signal;
a second demodulator for demodulating the delayed input signal to produce a lower layer signal, the second demodulator communicatively coupled to the delay element;
a combiner for combining the upper layer signal and the lower layer signal, the combiner communicatively coupled to the first demodulator and the second demodulator; and
a decoder, communicatively coupled to the combiner, the decoder for decoding the combined upper layer signal and the lower layer signal.

38. The apparatus of claim 37, wherein:
the coded input signal includes inserted initialization data having predetermined lower layer signal data; and
the combined upper layer signal and the lower layer signal are decoded according to the initialization data.

39. The apparatus of claim 37, wherein:
at least a portion of the coded input signal includes a separately encoded upper layer signal and lower layer signal; and
the at least a portion of the coded input signal is decoded according to the initialization data.

40. The apparatus of claim 37, further comprising:
an encoder communicatively coupled to the decoder, the encoder for re-encoding the upper layer signal;
a modulator, communicatively coupled to the encoder, the modulator for remodulating the upper layer signal; and
a differencer module, communicatively coupled to the modulator and the second demodulator, for extracting the lower layer signal from the input signal by subtracting the re-encoded and remodulated upper layer signal from the input signal.

41. The apparatus of claim 40, wherein the input signal is delayed by an amount of time necessary to re-encode and remodulate the upper layer signal.

42. The apparatus of claim 37, further comprising a de-interleaver, communicatively coupled to the decoder, the de-interleaver for de-interleaving the decoded combined upper layer signal and the lower layer signal.

43. A method of decoding a coded input signal having an upper layer modulated signal and a lower layer modulated signal, comprising the steps of:
demodulating the input signal to produce an encoded upper layer signal;
demodulating the input signal to produce an encoded lower layer signal;
multiplexingly applying the encoded upper layer signal and the encoded lower layer signal to a signal encoder to produce the upper layer signal and the lower layer signal;
wherein the step of demodulating the input signal to produce an encoded lower layer signal comprises the steps of re-encoding and remodulating the upper layer signal, and extracting the lower layer signal from the input signal by subtracting the re-encoded and remodulated upper layer signal from the input signal.

44. The method of claim 43, further comprising the step of de-interleaving the upper layer signal and the lower layer signal.

45. A method of decoding a coded input signal having an upper layer signal and a lower layer signal, comprising the steps of:
demodulating the coded input signal to produce a coded upper layer signal;
demodulating the coded input signal to produce a coded lower layer signal; and
multiplexingly decoding the coded upper layer signal and the coded second layer signal;
wherein the step of demodulating the coded input signal to produce a coded lower layer signal comprises the steps of decoding the coded upper layer signal, re-encoding and remodulating the decoded upper layer signal, and extracting the lower layer signal from coded input signal by subtracting the re-encoded and remodulated upper layer signal from the input signal.

46. The method of claim 45, wherein the step of alternately decoding the coded upper layer signal and the coded second layer signal comprises the step of alternately applying the coded upper layer signal and the coded lower layer signal to a decoder.

47. An apparatus for decoding a coded input signal having an upper layer modulated signal and a lower layer modulated signal, comprising:
   means for demodulating the input signal to produce an encoded upper layer signal;
   means for demodulating the input signal to produce an encoded lower layer signal;
   means for multiplexingly applying the encoded upper layer signal and the encoded lower layer signal to a signal decoder to produce the upper layer signal and the lower layer signal;
   wherein the means for demodulating the input signal to produce an encoded lower layer signal comprises means for re-encoding and remodulating the upper layer signal, and means for extracting the lower layer signal from the input signal by subtracting the re-encoded and remodulated upper layer signal from the input signal.

48. The apparatus of claim 47, further comprising means for de-interleaving the upper layer signal and the lower layer signal.

49. An apparatus for decoding a coded input signal having an upper layer signal and a lower layer signal, comprising:
   means for demodulating the coded input signal to produce a coded upper layer signal;
   means for demodulating the coded input signal to produce a coded lower layer signal; and
   means for multiplexingly decoding the coded upper layer signal and the coded second layer signal;
   wherein the means for demodulating the coded input signal to produce a coded lower layer signal comprises means for decoding the coded upper layer signal, means for re-encoding and remodulating the decoded upper layer signal, and means for extracting the lower layer signal from coded input signal by subtracting the re-encoded and remodulated upper layer signal from the input signal.

50. The apparatus of claim 49, wherein the means for alternately decoding the coded upper layer signal and the coded second layer signal comprises means for alternately applying the coded upper layer signal and the coded lower layer signal to a decoder.

51. An apparatus for decoding a coded input signal having an upper layer modulated signal and a lower layer modulated signal, comprising:
   a first demodulator for demodulating the input signal to produce an encoded upper layer signal;
   a second demodulator for demodulating the input signal to produce an encoded lower layer signal;
   a multiplexer, communicatively coupled to the first demodulator and the second demodulator, the multiplexer for multiplexingly applying the encoded upper layer signal and the encoded lower layer signal to a signal decoder;
   an encoder, communicatively coupled to the decoder, for re-encoding the upper layer signal;
   a modulator, communicatively coupled to the encoder, the modulator for remodulating the re-encoded upper layer signal; and
   an extractor, communicatively coupled to the modulator and the second demodulator, the extractor for extracting the lower layer signal from the input signal by subtracting the re-encoded and remodulated upper layer signal from the input signal.

52. The apparatus of claim 51, further comprising a de-interleaver, communicatively coupled to the decoder.

* * * * *